United States Patent
Scheuermann et al.

[15] 3,656,932
[45] Apr. 18, 1972

[54] PROCESS FOR CONTROLLING UNDESIRED VEGETATION

[72] Inventors: Horst Scheuermann, Ludwigshafen/Rhine; Adolf Fischer, Mutterstadt/Pfalz, both of Germany

[73] Assignee: Badische Anilin- & Soda-Fabrik Aktiengesellschaft, Ludwigshafen/Rhine and Rhineland-Pfalz, Germany

[22] Filed: Sept. 6, 1968

[21] Appl. No.: 758,103

[30] Foreign Application Priority Data

Sept. 15, 1967 Germany ..................P 16 42 231.4

[52] U.S. Cl. .................................71/105, 71/103, 71/104
[51] Int. Cl. ..........................................................A01n 9/20
[58] Field of Search ...........................................71/105, 103

[56] References Cited

UNITED STATES PATENTS

| | | | |
|---|---|---|---|
| 2,834,800 | 5/1958 | Kapp et al. | 71/105 |
| 2,749,232 | 6/1956 | Ligett et al. | 71/105 |
| 2,667,411 | 1/1954 | Maury et al. | 71/105 |

OTHER PUBLICATIONS

Plaisted " Growth Suppression by a Cyanocinamic Acids" Contributions from Boyce Thompson Institute Vol. 18, (1955), 231– 242.

Primary Examiner—Lewis Gotts
Assistant Examiner—Catherine L. Mills
Attorney—Marzall, Johnston, Cook & Root

[57] ABSTRACT

A process for controlling undesired vegetation, in particular, a process for controlling undesired vegetation without damaging crop plants using substituted esters of N-phenylaminoacrylic acid.

6 Claims, No Drawings

PROCESS FOR CONTROLLING UNDESIRED VEGETATION

The present invention relates to a process for controlling undesired vegetation, especially for controlling unwanted plants without damaging crop plants.

The use of phenoxyacetic acids, particularly the potassium salt of 2-methyl-4-chlorophenoxyacetic acid is known for controlling undersired vegetation. The results are, however, unsatisfactory, because numerous unwanted plants are not, or only to a small extent, injured by the active ingredient.

We have found that compounds having the formula

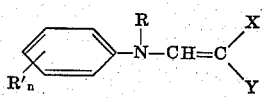

in which X and Y denote nitrile radicals, acetyl radicals or radicals -COOR'', wherein R'' denotes a lower aliphatic radical, R denotes hydrogen, a lower aliphatic radical or an aralkyl radical and R' denotes halogen, in particular chlorine or bromine, a lower saturated or unsaturated aliphatic radical, preferably a methyl or ethyl radical, or a haloalkyl radical, such as a trichloromethyl or trifluoromethyl radical, or an alkoxy radical, preferably a methoxy or ethoxy radical, a cyano or thiocyano group, a carboxyl group which may be esterified, a nitro group, a sulfonamide group which may be N-alkylated or an acylated amino group and $n$ denotes an integer from 0 to 5, wherein - should $n$ be greater than 1 - the radicals R' may be identical or different, have a good herbicidal action.

The compounds to be used in accordance with this invention may be produced by reacting N-substituted formanilide chlorides with methylene-active compounds such as alkyl cyanoacetates, dialkyl malonates, malononitrile or acetoacetate (Chem. Ber., 94, 2285(1961)).

However, in accordance with J. Am. Chem. Soc., 68, 1253 (1946) or J.Am. Chem. Soc., 82, 718 (1960), these compounds may also be produced by reacting alkyl ethoxymethylene cyanoacetates, ethoxymethylene malononitrile dialkyl ethoxymethylene malonates or ethoxymethylene acetoacetates with appropriately substituted aniline derivatives.

For example, ethyl β-(N-phenyl-N-methyl)-amino-α-cyano acrylate may be prepared by the following method: 40.5 parts of N-methyl-formanilide is added within 20 minutes at 0° C to a solution of 33 parts by weight of phosgene in 150 parts of toluene. After stirring for 2 hours at room temperature (20° C), 33.9 parts of ethyl cyanoacetate and 60.6 parts of triethylamine are added to the mixture and the whole is stirred at 60° to 70° C for a further 2 hours. After cooling and suction filtering the precipitated triethylamine hydrochloride, the filtrate is concentrated in vacuo. 52 parts (75 percent of the theory) of the acrylic acid derivative having a melting point of 102° to 104° is obtained.

The active ingredients may be made units emulsions or dispersions by means of emulsifiers and dispersants and adding solvents, e.g., mineral oil fractions, such as coal tar oils or diesel oil or vegetable oils or cyclic hydrocarbons or inert material such as diatomite or kaolin, and, after the addition of water, may be used as herbicides. It is possible to use the herbicides as granules as well as to mix them with fertilizers, other herbicides, fungicides or insecticides.

EXAMPLE 1

In a greenhouse, the plants Indian corn (*Zea mays*), rice (*Oryza sativa*), cotton (*Gossypium sp.*), potatoes (*Solanum tuberosum*), wild mustard (*Sinapis arvensis*), white goosefoot (*Chenopodium album*), small nettle (*Urtica urens*), annual meadow grass (*Poa annua*), slender foxtail (*Alopecurus myosuroides*) and barnyard grass (*Echinochloa crus-galli*) were treated at a growth height of 2 to 15 cm with 2 kg/ha of the active ingredient ethyl β-(N-phenyl-N-methyl)-amino-α-cyano acrylate (I), and, for comparison, with 2 kg/ha of the potassium salt of 2-methyl-4-chlorophenoxyacetic acid (II), this amount of both active ingredients being dissolved or dispersed in 500 liters of water per hectare. After 3 to 4 weeks the results were determined:

| | Active ingredient | |
|---|---|---|
| | I | II |
| Crop plants: | | |
| Indian corn | 0–10 | 40 |
| Rice | 0 | 20 |
| Cotton | 10 | 80 |
| Unwanted plants: | | |
| Wild mustard | 90–100 | – |
| White goosefoot | 80 | 90–100 |
| Small nettle | 100 | 90–100 |
| Annual meadow grass | 80 | 10 |
| Slender foxtail | 80 | 10–20 |
| Barnyard grass | 90 | 0–10 |

0 = no damage,      100 = total destruction

EXAMPLE 2

An agricultural cultivated area overgrown with small nettle (*Urtica urens*), white goosefoot (*Chenopodium album*), wild mustard (*Sinapis arvensis*), common chickweed (*Stellaria media*), annual meadow grass (*Poa annua*), barnyard grass (*Echinochloa crus-galli*) and slender foxtail (*Alopecurus myosuroides*), was treated at a growth height of 2 to 8 cm with 5 kg/ha of the active ingredient ethyl β-(N-phenyl-N-methyl)-amino-α-cyano acrylate (I), dispersed in 600 liters of water per hectare.

After 3 to 4 days the above-mentioned weeds and weed grasses started to wither, and, after 2 to 3 weeks, all weeds and weed grasses had been almost completely destroyed. The area could be cultivated again.

EXAMPLE 3

Plastic pots having a diameter of 8 cm were filled with loamy sandy oil and then sown with seeds of Indian corn (*Zea mays*), rice (*Oryza sativa*), cotton (*Gossypium sp.*), potatoes (*Solanum tuberosum*), wild mustard (*Sinapis arvensis*), small nettle (*Urtica urens*) and barnyard grass (*Echinochloa crus-galli*). Then the soil prepared in this way was treated with 3 kg/ha of ethyl β-(N-phenyl-N-methyl)-amino-α-cyano acrylate dispersed in 500 liters of water per hectare. After 4 to 5 weeks it was ascertained that the weeds wild mustard, small nettle and barnyard grass had been almost completely destroyed, whereas Indian corn, rice, cotton and potatoes were undamaged and continued to grow.

The following compounds are just as biologically effective as the active ingredient I in Examples 1, 2 and 3:

ethyl β-(N-p-methylphenyl-N-methyl)-amino-α-cyano acrylate
ethyl β-(N-p-methylphenyl)-amino-α-cyano acrylate
ethyl β-(N-3,4-dichlorophenyl)-amino-α-cyano acrylate
ethyl β-(N-2,4-dichlorophenyl)-amino-α-cyano acrylate
ethyl β-(N-phenyl)-amino-α-cyano acrylate
ethyl β-(N-m-chlorophenyl)-amino-α-carbethoxy acrylate
ethyl β-(N-m-trifluoromethylphenyl)-amino-α-carbethoxy acrylate
ethyl β-(N-o-cyanophenyl)-amino-α-carbethoxy acrylate
ethyl β-(N-phenyl)-amino-α-carbethoxy acrylate
ethyl β-(N-p-bromophenyl)-amino-α-carbethoxy acrylate
ethyl β-(N-2,4,5-trichlorophenyl)-amino-α-carbethoxy acrylate
ethyl β-(N-p-methylphenyl)-amino-α-acetyl acrylate
ethyl β-(N-m-chlorophenyl)-amino-α-acetyl acrylate
ethyl β-(N-m-trifluoromethylphenyl)-amino-α-acetyl acrylate
ethyl β-(N-o-cyanophenyl)-amino-α-acetyl acrylate
ethyl β-(N-phenyl)-amino-α-acetyl acrylate ethyl β-(N-p-bromophenyl)-amino-α-acetyl acrylate
ethyl β-(N-2,4,5-trichlorophenyl)-amino-α-acetyl acrylate.

We claim:

1. A process for controlling growth of unwanted plants which comprises treating the locus thereof with a phytotoxic amount of a selective herbicide from the group consisting of ethyl β-(N-phenyl-N-methyl)-amino-α-cyano acrylate, ethyl β-(N-p-methyphenyl-N-methyl)-amino-α-cyano acrylate, ethyl β-(N-dichlorophenyl)-amino-α-cyano acrylate, ethyl β-(N-dichlorophenyl)-amino-α-cyano acrylate, and ethyl β-(N-phenyl)-amino-α-cyano acrylate.

2. A process as claimed in claim 1, wherein said selective herbicide is ethyl β-(N-phenyl-N-methyl)-amino-α-cyano acrylate.

3. A process as claimed in claim 1, wherein said selective herbicide is ethyl β-(N-p-methylphenyl-N-methyl)-amino-α-cyano acrylate.

4. A process as claimed in claim 1, wherein said selective herbicide is ethyl β-(N-dichlorophenyl)-amino-α-cyano acrylate.

5. A process as claimed in claim 1, wherein said selective herbicide is ethyl β-(N-dichlorophenyl)-amino-α-cyano acrylate.

6. A process as claimed in claim 1, wherein said selective herbicide is ethyl β-(N-phenyl)-amino-α-cyano acrylate.

* * * * *

UNITED STATES PATENT OFFICE
CERTIFICATE OF CORRECTION

Patent No. 3,656,932  Dated April 18, 1972

Inventor(s) Horst Scheuermann and Adolf Fischer

It is certified that error appears in the above-identified patent and that said Letters Patent are hereby corrected as shown below:

First page, right-hand column, "a Cyanocinamic" should read -- $\alpha$ Cyanocinnamic --.

Column 1, line 8, "undersired" should read --undesired--.

Column 2, in the table under "II", "$\pi$" should read --90--.

Column 3, line 8, "60" should read --$\alpha$--.

Column 3, line 9, "dichlorophenyl" should read --p-methyl-phenyl-- (applicants' error).

Column 4, line 9, "dichlorophenyl" should read --p-methyl-phenyl-- (applicants' error)

Signed and sealed this 3rd day of December 1974.

(SEAL)
Attest:

McCOY M. GIBSON JR.
Attesting Officer

C. MARSHALL DANN
Commissioner of Patents